(12) United States Patent
Begley et al.

(10) Patent No.: US 11,376,898 B1
(45) Date of Patent: Jul. 5, 2022

(54) AIR INFLATION SYSTEM

(71) Applicant: Globetech Manufacturing, Inc., Dayton, OH (US)

(72) Inventors: Tim Begley, Xenia, OH (US); Paul Dean Nelson, Martinsville, IN (US)

(73) Assignee: Globetech Manufacturing, Inc., Dayton, OH (US)

( * ) Notice: Subject to any disclaimer, the term of this patent is extended or adjusted under 35 U.S.C. 154(b) by 0 days.

(21) Appl. No.: 17/305,950

(22) Filed: Jul. 19, 2021

(51) Int. Cl.
*B60C 23/00* (2006.01)

(52) U.S. Cl.
CPC .. *B60C 23/00363* (2020.05); *B60C 23/00318* (2020.05)

(58) Field of Classification Search
CPC ................... B60C 23/00363; B60C 23/00318
See application file for complete search history.

(56) References Cited

U.S. PATENT DOCUMENTS

| | | | |
|---|---|---|---|
| 5,584,949 | A | 12/1996 | Ingram |
| 5,769,919 | A | 6/1998 | Claassen et al. |
| 5,769,979 | A | 6/1998 | Naedler |
| 6,105,645 | A * | 8/2000 | Ingram ............. B60C 23/00345 |
| | | | 152/415 |
| 6,131,631 | A | 10/2000 | Bradley et al. |
| 6,145,559 | A * | 11/2000 | Ingram, II ........ B60C 23/00336 |
| | | | 152/417 |
| 6,325,124 | B1 | 12/2001 | Colussi et al. |
| 6,698,482 | B2 | 3/2004 | Hennig et al. |
| 7,207,365 | B2 | 4/2007 | Nelson et al. |
| 7,302,980 | B2 | 12/2007 | Ingram |
| 8,746,305 | B2 * | 6/2014 | Lloyd ............... B60C 23/00318 |
| | | | 152/417 |
| 10,005,325 | B2 | 6/2018 | Cappello et al. |
| 10,086,660 | B1 | 10/2018 | Berkness et al. |
| 10,471,782 | B2 | 11/2019 | Musgrave et al. |
| 10,596,862 | B1 | 3/2020 | Cappello et al. |
| 10,596,863 | B1 | 3/2020 | Castriotta |
| 10,647,169 | B1 | 5/2020 | Castriotta et al. |
| 10,668,777 | B2 | 6/2020 | Musgrave et al. |
| 10,696,106 | B2 | 6/2020 | Hennig |

(Continued)

FOREIGN PATENT DOCUMENTS

| | | | |
|---|---|---|---|
| WO | 2018118425 | A1 | 6/2018 |
| WO | 2019014580 | A1 | 1/2019 |
| WO | WO-2021030485 | A1 * | 2/2021 ....... B60C 23/00345 |

*Primary Examiner* — Scott A Browne
(74) *Attorney, Agent, or Firm* — Stevens & Showalter LLP

(57) ABSTRACT

An air inflation system is provided for a vehicle including an axle that supports a wheel and an air supply structure. The air inflation system includes a rotary coupler having a tubular member for communicating with the air supply, a sleeve member connected to an end portion of the tubular member, a bearing receiving the sleeve member, a housing body having a passageway therethrough, wherein the tubular member is received in the passageway, and a housing cap attached to the housing body, wherein the housing cap is provided for communicating with at least one air connection element in communication with the wheel. A first seal for sealing an area between the tubular member and the housing body, and a second seal for sealing an area between the housing body and the housing cap are included. The rotary coupler is provided for supplying air from the air supply to the wheel.

18 Claims, 4 Drawing Sheets

(56) References Cited

U.S. PATENT DOCUMENTS

| | | | |
|---|---|---|---|
| 2005/0194079 A1 | 9/2005 | Hennig | |
| 2013/0199685 A1* | 8/2013 | Nelson | B60B 37/00 |
| | | | 152/415 |
| 2016/0348819 A1* | 12/2016 | Patrick | E21B 17/085 |

* cited by examiner

AIR INFLATION SYSTEM

FIELD OF THE INVENTION

The present invention relates to an air inflation system for a vehicle including an axle that supports at least one wheel.

BACKGROUND OF THE INVENTION

The present invention is directed to an air inflation system for controlling the inflation pressures of one or more tires on a vehicle.

SUMMARY OF THE INVENTION

In accordance with the first aspect of the present invention, an air inflation system for a vehicle including an axle that supports a wheel and an air supply structure that includes air is provided. The air inflation system comprises a rotary coupler. The rotary coupler comprises a tubular member for communicating with the air supply structure, a sleeve member connected to an end portion of the tubular member, and a bearing having an opening that receives the sleeve member. The rotary coupler further comprises a housing body having a hollow interior portion, wherein the tubular member is received in the hollow interior portion, and a housing cap attached to the housing body, wherein the housing cap is provided for communicating with at least one air connection element that is in communication with the wheel. A first seal for sealing an area between the tubular member and the housing body, and a second seal for sealing an area between the housing body and the housing cap are provided. The rotary coupler is provided for supplying air from the air supply to the wheel.

The sleeve member may be flexible. A second end of the tubular member may include a collar portion. The collar portion of the tubular member may be received in a first end of the flexible sleeve member.

The housing body may include a threaded portion that engages an internal threaded portion of the housing cap, and the housing body and the housing cap may cooperate to form a housing assembly.

The first and second seals may be located within the housing assembly. The bearing may contact the second seal, and the bearing may aid in maintaining the sleeve member in position within the housing body.

The sleeve member may engage the tubular member in the hollow interior portion of the housing body, and the tubular member may extend through the first seal within the housing body.

The sleeve member may extend into an opening defined by the second seal, and the sleeve member may not engage the housing cap.

The rotary coupler may be adapted to be received in an opening in a vent shield, wherein the vent shield may engage a hubcap and may act as a shield for holes in a top of the hubcap to militate against the access of debris from the environment into the hubcap.

The rotary coupler may be adapted to be received in an opening in a deflector shield, wherein the deflector shield may engage the vent shield and may act to protect the vent shield from damage.

The at least one air connection element may comprise a first air connection element that engages a first end of a first hose, and the first hose may include a second end that communicates with a first tire valve stem.

The at least one air connection element may further comprise a second air connection element that engages a first end of a second hose, and the second hose may include a second end that communicates with a second tire valve stem.

The rotary coupler may further comprise a spacer having an opening that receives the tubular member, and the spacer may aid in the connection of the tubular member and the sleeve member.

BRIEF DESCRIPTION OF THE DRAWINGS

While the specification concludes with claims particularly pointing out and distinctly claiming the present invention, it is believed that the present invention will be better understood from the following description in conjunction with the accompanying Figures, in which like reference numerals identify like elements, and wherein:

DETAILED DESCRIPTION OF THE INVENTION

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the invention.

Figure 1A:
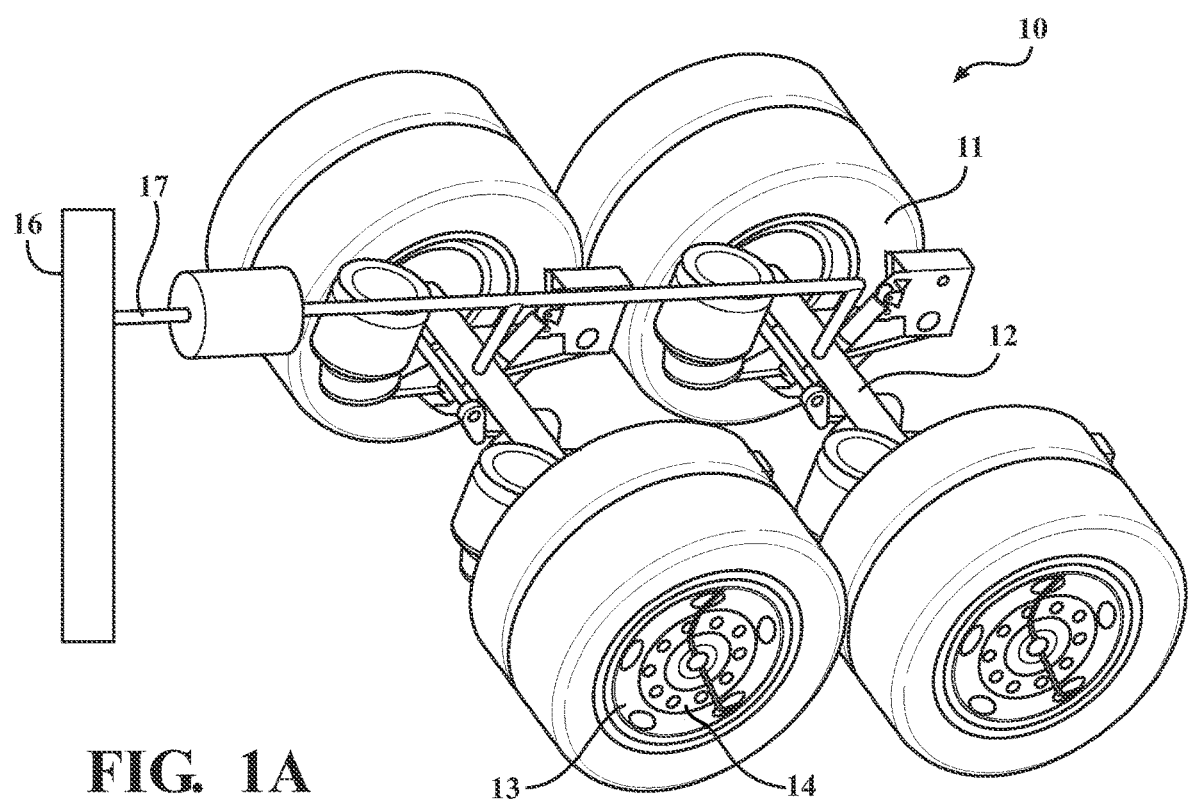
FIG. 1A illustrates an air inflation system according to an aspect of the present invention.
Figure 2:
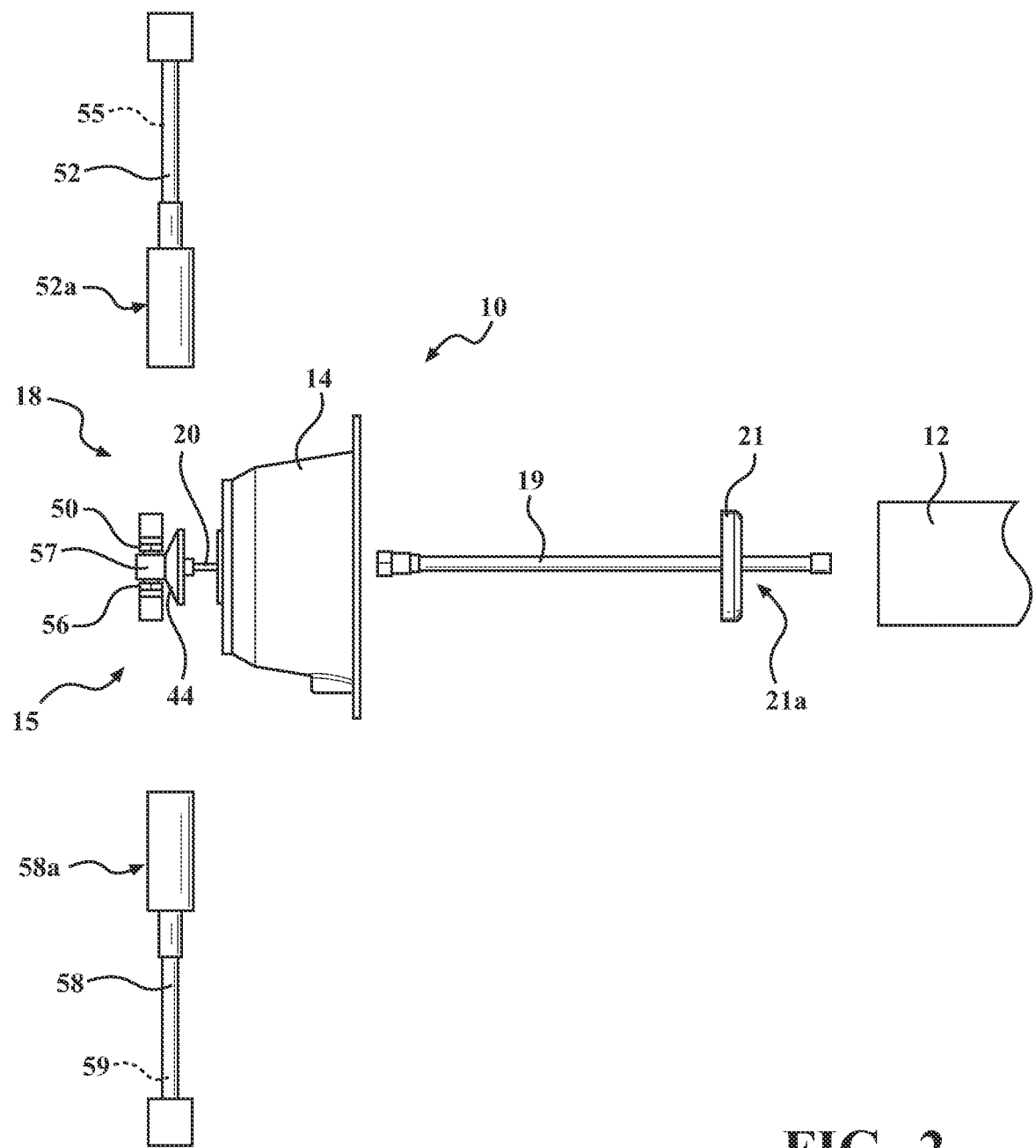
FIG. 2 illustrates an exploded view of the rotary coupler of FIG. 1B.

Referring to FIGS. 1A and 2, an automatic air inflation system 10 for a vehicle (not shown) having rotatable tires 11 is shown. The system 10 utilizes a rotary air connection 15 (see FIG. 2) for supplying air from an air supply structure 16 (see FIG. 1A) of the system 10 to the rotatable tires 11 of the vehicle. An axle 12 of the vehicle supports wheels 13 and associated tires 11 at respective ends of the axle 12. A hub cap 14 is provided at each end of the axle 12. The air supply structure 16 supplies air to the rotary air connection 15 through the inside of the axle 12. An air supply line 17 provides air from the air supply structure 16 to the interior of the axle 12, see FIG. 1A.

With reference now to FIG. 2, the automatic air inflation system 10 further includes one or more rotary couplers 18 and corresponding stators 19 and press plugs 21 (one rotary coupler 18 with its corresponding stator 19 and press plug 21 is illustrated in FIG. 2). One of the rotary couplers 18 with its corresponding stator 19 and press plug 21 will now be described, it being understand that any additional rotary couplers 18 with corresponding stator 19 and press plug 21 (each wheel 13 may include a rotary coupler 18 with corresponding stator 19 and press plug 21) may be substantially similar to the described rotary coupler 18. The press plugs 21 seals the end of the axles 12 and includes a threaded hole 21a for the stators 19 to screw into. The stator 19 provides air from the axle 12 to the rotary coupler 18.

Figure 3:
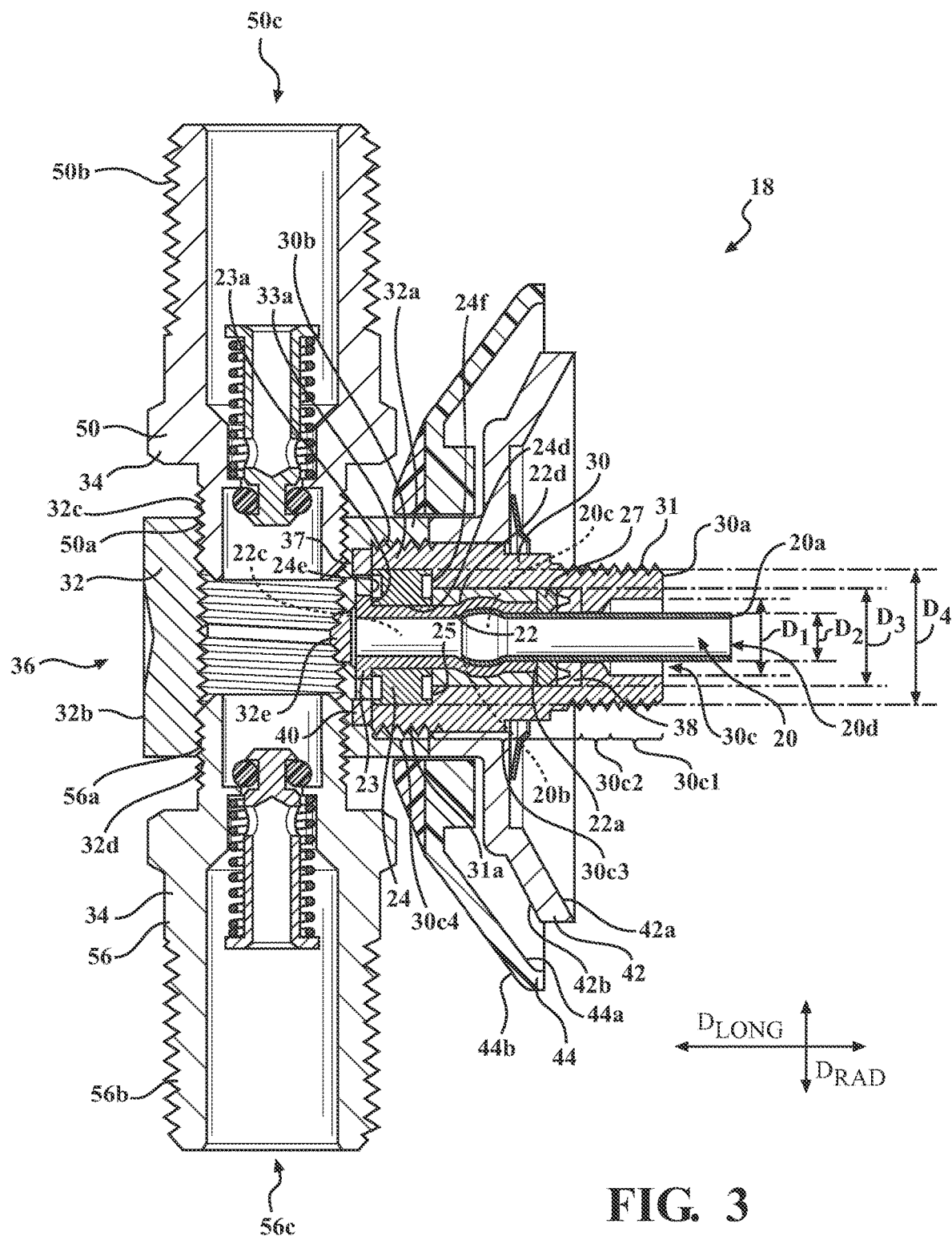
FIG. 3 is a side view, partially in cross section, of the rotary coupler of FIGS. 1B and 2.
Figure 4:
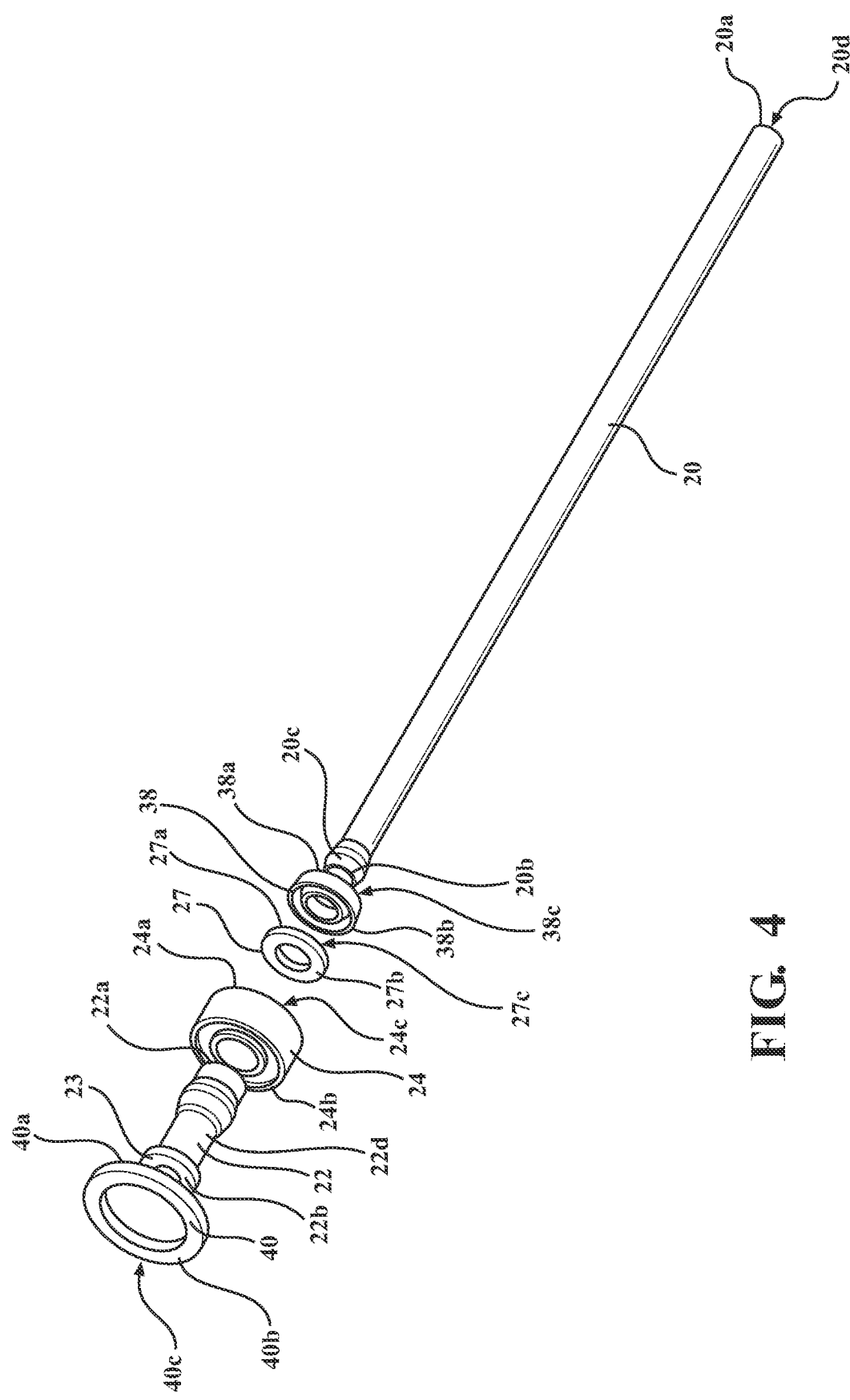
FIG. 4 is an exploded view of select components of the rotary coupler of FIGS. 1B, 2, and 3.

With reference to FIGS. 3 and 4, the rotary coupler 18 includes an elongate tubular member 20 having a direction of elongation in a longitudinal direction $D_{LONG}$ of the rotary coupler 18 as shown in FIG. 3. The tubular member 20 is preferably formed from a rigid material such as, for example, stainless steel. The tubular member 20 has a first end 20a in fluid communication with the air supply structure 16 via the air supply line 17 and the stator 19, and a second end 20b downstream from the first end 20a, wherein the term "downstream" as used herein is defined with respect to a flow direction of air being provided from the air supply structure 16 to the corresponding tire 11. The tubular member 20 includes a collar portion 20c at the second end 20b thereof. A first passageway 20d is defined within the tubular member 20 for conveying air from the stator 19 downstream toward the tire 11.

The collar portion 20c of the tubular member 20 is received by a first end 22a of a sleeve member 22 to couple the tubular member 20 to the sleeve member 22 via a friction fit. The sleeve member 22 further includes a second end 22b downstream from the first end 22a, wherein a second passageway 22c defined by the sleeve member 22 receives air from the first passageway 20d of the tubular member 20. The second end 22b of the sleeve member 22 includes a lip 23. The sleeve member 22 may be formed from a flexible material, for example Viton. The flexibility of the sleeve member 22 helps to absorb vibrations generated by the wheel 13 during operation of the vehicle so as to reduce vibrations conveyed to the tubular member 20 and the air supply line 17. The flexible material of the sleeve member 22 stretches to accommodate the collar portion 20c of the tubular member 20, and the connection of the sleeve member 22 to the tubular member 20 provides an air tight seal to prevent the loss of air flowing through the air inflation system 10 to the tire 11. The flexible material of the sleeve member 22 also absorbs vibrations coming from the wheel end.

The rotary coupler 18 further includes a cylindrical bearing 24 having a first end 24a and a second end 24b opposite the first end. The bearing 24 defines an opening 24c that receives the sleeve member 22, see FIG. 4. An inner surface 24d of the bearing 24 that defines the opening 24c contacts and supports an outer surface 22d of the sleeve member 22. A longitudinally facing surface 23a of the lip 23 of the sleeve member 22 abuts a corresponding first longitudinally facing surface 24e of the bearing 24 to act as a stop to prevent the sleeve member 22 from moving in the longitudinal direction $D_{LONG}$ out of the opening 24c, as shown in FIG. 3. The bearing 24 may be a self-lubricating bearing that may include a lubricating substance, such as, for example, Synco SL-41031. The inner surface 24d of the bearing 24 that contacts the outer surface 22d of the sleeve member 22 may include an adhesive to adhere the sleeve member 22 to the inner surface 24c of the bearing 24. The sleeve member 22 and the inner portion of the bearing 24 remain stationary while the outer portion of the bearing 24 rotates with the tire 11. As an alternative to an adhesive, a pressure fit may be used between the inner portion of the bearing 24 to the sleeve member 22.

The rotary coupler 18 further includes a spacer 27 having a first end 27a and a second end 27b opposite the first end 27a, see FIG. 4. The spacer 27 defines an opening 27c that receives the tubular member 20. The spacer 27 aids in securing the friction fit between the tubular member 20 and the sleeve member 22.

The rotary coupler 18 further includes a housing body 30 having a first end 30a, a second end 30b opposite the first end 30a, and including an elongate hollow interior portion 30c extending in the longitudinal direction $D_{LONG}$ from the first end 30a to the second end 30b. The interior portion 30c may vary in diameter from the first end 30a to the second end 30b of the housing body 30. For example, a first section 30c1 of the interior portion 30c at the first end 30a may have a first diameter $D_1$. A second section 30c2 of the interior portion 30c may have a second diameter $D_2$. The second diameter $D_2$ of the second section 30c2 is intended to have a close tolerance to the tubular member 20 to allow the tubular member 20 to rotate while also preventing movement of the tubular member 20 in a radial direction $D_{RAD}$, the radial direction $D_{RAD}$ being perpendicular to the longitudinal direction $D_{LONG}$ as shown in FIG. 3. A third section 30c3 of the interior portion 30c between the first and second ends 30a, 30b may have a third diameter $D_3$ that is greater than the first diameter $D_1$ and the second diameter $D_2$. The third diameter $D_3$ of the third section 30c3 is larger than the first diameter $D_1$ and the second diameter $D_2$ in order to accommodate the connection of the tubular member 20 and the sleeve member 22, as the coupling of the collar portion 20c of the tubular member 20 and the first end 22a of the sleeve member 22 has a bigger radius than that of the tubular member 20, see FIG. 3. A fourth section 30c4 of the interior portion 30c at the second end 30b may have a fourth diameter $D_4$ that is greater than the third diameter $D_3$. The fourth diameter $D_4$ is intended to be large enough to receive the bearing 24 while having a close tolerance thereto to militate against movement of the bearing 24 in the radial direction $D_{RAD}$.

The sleeve member 22 engages the tubular member 20 in the interior portion 30c of the housing body 30, and more particularly in the third section 30c3 of the interior portion 30c. The housing body 30 further includes a step 25, wherein a second longitudinally facing surface 24f of the bearing 24 abuts the step 25 in the housing body 30 to prevent the bearing 24 from moving in the longitudinal direction $D_{LONG}$ past the step 25. The positioning of the bearing 24 aids in maintaining the sleeve member 22 in position within the housing body 30 by militating against movement of the sleeve member 22 in the radial direction $D_{RAD}$. Specifically, the opening 24c of the bearing 24 has a close tolerance to the sleeve member 22 so as to allow the sleeve member 22 to be received in the opening 24c, while also preventing substantial movement of the sleeve member 22 in the radial direction $D_{RAD}$. The bearing 24 also aids in preventing movement of the sleeve member 22 in the longitudinal direction $D_{LONG}$, as the lip 23 of the sleeve member 22 abuts the second side 24b of the bearing 24 such that the sleeve member 22 is prevented from being pulled out of the bearing 24 in the longitudinal direction toward axle 12. As shown in FIGS. 3 and 4, the housing body 30 is secured to a housing cap 32 via a threaded connection. More specifically, a first end 32a of the housing cap 32 includes an internal threaded portion 33a that is threadedly secured to a threaded portion 31a of the second end 30b of the housing body 30.

The housing cap 32 additionally includes a second end 32b opposite to the first end 32a, a first threaded exit opening 32c between the first and second ends 32a, 32b, and a second threaded exit opening 32d opposite to the first threaded exit opening 32c. A passageway 32e defined by the housing cap 32 extends from the first end 32a to the first and second threaded exit openings 32c, 32d.

The threaded openings 32c, 32d provide connection points for respective air connection elements 34 that are in fluid communication with the wheel 13 to deliver air to the tire 11. It is noted that additional or fewer threaded exit openings and corresponding air connection elements 34 can be used in the system 10. It is also noted that not all of the threaded openings may be used to deliver air to the tire 11, i.e., a structure such as a cap (not shown) may be provided over the one or more exit openings not being used to deliver air to the tire 11. The threaded portion 31a of the second end 30b on the housing body 30 and the internal threaded portion 33a of the first end 32a of the housing cap 32 threadably couple the housing body 30 to the housing cap 32, wherein the housing body 30 and the housing cap 32 together form a housing assembly 36.

The at least one air connection element 34 of the rotary coupler 18 according to the embodiment shown comprises a first air connection element 50 that includes a first threaded portion 50a, a second threaded portion 50b, and a passageway 50c (see FIG. 3), and a second air connection element 56 that includes a first threaded portion 56a, a second threaded portion 56b, and a passageway 56c, although additional or fewer air connection elements may be used as desired as noted above.

As shown in FIGS. 3 and 4, the rotary coupler 18 further includes a first seal 38 for sealing an area between the tubular member 20 and the housing body 30. The first seal includes a first side 38a and a second side 38b opposite the first side 38a, and defines an opening or hollow interior portion 38c. The tubular member 20 is received in and extends through the hollow interior portion 38c of the first seal 38. The first seal 38 may be formed from a flexible material to absorb vibrations of the wheel 13 and thus reduce vibrations conveyed to the tubular member 20.

The rotary coupler 18 additionally includes a second seal 40 for sealing an area between the housing body 30 and the housing cap 32. The second seal 40 includes a first side 40a and a second side 40b opposite the first side 40a, and defines an opening or hollow interior portion 40c. The second seal 40 rests upon and contacts the bearing 24. The sleeve member 22 extends into the second seal 40 and does not engage the housing cap 32. The second seal 40 may be a compression seal to prevent air leakage between the housing body 30 and the housing cap 32.

As can be seen in FIG. 3, the first seal 38 and the second seal 40 are located within the housing assembly 36, wherein the first seal 38 is located near the first end 30a of the housing body 30, and the second seal 40 is located near the second end 30b of the housing body 30. More specifically, the first seal 38 is located within the third section 30c3 of the housing body 30, and the second seal 40 is located between the second end 30b of the housing body 30 and a longitudinally facing interior wall 37 of the housing cap 32. Both the first seal 38 and the second seal 40 prevent air from escaping the housing assembly 36 while also preventing debris or other particles from entering the housing assembly 36.

As shown in FIG. 3, the housing assembly 36 completely encapsulates the spacer 27, the first seal 38, the second seal 40, the bearing 24, and the sleeve member 22, such that none of these components comes into contact with the hubcap 14. The spacer 27 is located between the sleeve member 22 and the first seal 38 such that the second side 38b of the first seal 38 contacts the first side 27a of the spacer 27, and the second side 27b of the spacer 27 contacts the first end 22a of the sleeve member 22. The tubular member 20 is connected to the sleeve member 22 in the third section 30c3 of the housing body 30. The lip 23 of the sleeve member 22 contacts the second end 24b of the bearing 24 and also enters into an opening defined by the second seal 40, but does not contact the second seal 40 or the housing cap 32.

Referring to FIG. 3, a vent shield 42 of the system 10 includes an inner surface 42a, an outer surface 42b, and an opening 42c. The vent shield inner surface 42a abuts an outer surface 14b of the hubcap 14 and provides venting to ensure that pressure does not build up in the hubcap 14. If a predetermined amount of pressure builds up in the hubcap 14, the vent shield 42 will disengage from the hubcap 14 to provide venting so as to reduce the pressure. Once the pressure is decreased to an amount below the predetermined amount, the vent shield returns back to its position engaging the hubcap 14. The vent shield 42 also acts as a shield for holes in a top of the hubcap 14 to militate against the access of debris from the environment into the hubcap 14. A deflector shield 44 of the system 10 includes an inner surface 44a, an outer surface 44b, and an opening 44c. The deflector shield inner surface 44a engages the vent shield outer surface 44b and acts both as a shield to protect the vent shield 42 from damage, and as a shield to militate against the access of debris from the environment into the vent shield 42 and the hubcap 14.

Figure 1B:
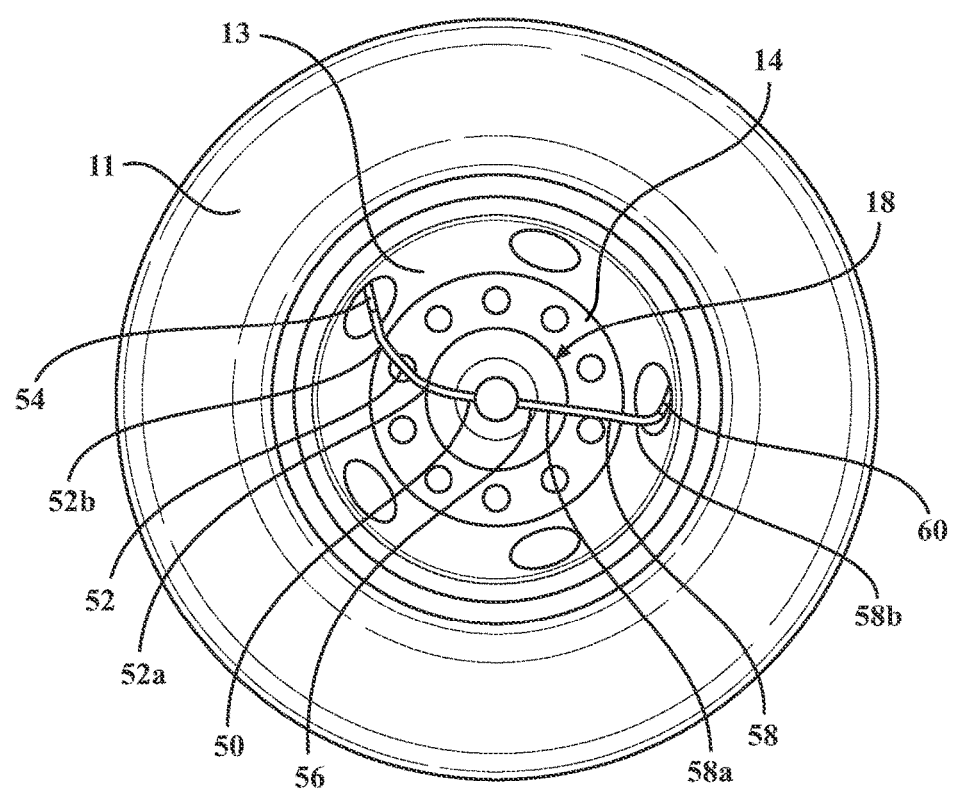
FIG. 1B illustrates a rotary coupler of the air inflation system of FIG. 1A connected to a wheel.

Referring to FIGS. 1B and 2, which illustrate the rotary coupler 18 while connected to the wheel 13, the rotary coupler 18 is threaded to the hubcap 14 and rotates with the tire 11. The air inflation system 10 according to the embodiment shown further includes a first hose 52 having a first end 52a, a second end 52b, and defines a passageway 55 therethrough. The air inflation system 10 also includes a first tire valve stem 54. The first threaded portion 50a of the first air connection element 50 threadedly engages and communicates with one of the threaded exit openings 32c, 32d of the housing cap 32, and the second threaded portion 50b of the first air connection element 50 engages a first end 52a of the first hose 52, see FIG. 3. The second end 52b of the hose 52 communicates with the first tire valve stem 54. The air inflation system according to the embodiment shown also includes a second hose 58 having a first end 58a, a second end 58b, and defines a passageway 59 therethrough. The air inflation system also includes a second tire valve stem 60. The first threaded portion 56a of the second air connection element 56 threadedly engages and communicates with the other of the threaded exit openings 32c, 32d of the housing cap 32. The second threaded portion 56b of the second air connection element 56 engages a first end 58a of the second hose 58, and the second end 58b of the second hose 58 communicates with the second tire valve stem 60.

The housing body 30, the housing cap 32 and the air connection elements 50 and 56 together make up a through-tee assembly 57. The hoses 52, 58 may be of the same length, or alternatively, may be two different lengths, e.g., one hose may be a long hose and the other hose may be a short hose.

In operation, the rotary coupler 18 is connected to the wheel 13 such that the air inflation system 10 is able to provide air to the tire 11. Specifically, air is injected into the axle 12, which is pressurized, via the air supply line 17 from the air supply structure 16. The air from the axle 12 flows through the stator 19, into the tubular member 20, through the sleeve member 22 and into the through-tee 57. The air then flows through the at least one hose 52, 58, and into the tire 11.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An air inflation system for a vehicle including an axle that supports a wheel and an air supply structure that includes air, the air inflation system comprising:
 a rotary coupler comprising:
  a tubular member for communicating with the air supply structure;
  a sleeve member connected to an end portion of the tubular member;
  a bearing having an opening that receives the sleeve member;
  a housing body having a hollow interior portion, wherein the tubular member is received in the hollow interior portion;
  a housing cap attached to the housing body, wherein the housing cap is provided for communicating with at least one air connection element that is in communication with the wheel;
  a first seal for sealing an area between the tubular member and the housing body, wherein the first seal engages the tubular member and the housing body;
  a second seal for sealing an area between the housing body and the housing cap;
 wherein the rotary coupler is provided for supplying air from the air supply structure to the wheel.

2. The air inflation system of claim 1, wherein the sleeve member is formed from a flexible material.

3. The air inflation system of claim 2, wherein a second end of the tubular member includes a collar portion, and the collar portion is received in a first end of the sleeve member.

4. The air inflation system of claim 1, wherein the housing body includes a threaded portion that engages an internal threaded portion of the housing cap, and the housing body and the housing cap cooperate to form a housing assembly.

5. The air inflation system of claim 4, wherein the first and second seals are located within the housing assembly.

6. The air inflation system of claim 1, wherein the bearing contacts the second seal.

7. The air inflation system of claim 1, wherein the bearing aids in maintaining the sleeve member in position within the housing body.

8. The air inflation system of claim 1, wherein the sleeve member engages the tubular member in the hollow interior portion of the housing body.

9. The air inflation system of claim 1, wherein the tubular member extends through the first seal within the housing body.

10. The air inflation system of claim 1, wherein the sleeve member extends into an opening defined by the second seal.

11. The air inflation system of claim 1, wherein the sleeve member does not engage the housing cap.

12. The air inflation system of claim 1, wherein the rotary coupler is adapted to be received in an opening in a vent shield, wherein the vent shield engages a hubcap and acts as a shield for holes in a top of the hubcap to militate against the access of debris from the environment into the hubcap.

13. The air inflation system of claim 12, wherein the rotary coupler is adapted to be received in an opening in a deflector shield, wherein the deflector shield engages the vent shield and acts to protect the vent shield from damage.

14. The air inflation system of claim 1, wherein the at least one air connection element comprises a first air connection element that engages a first end of a first hose, the first hose including a second end that communicates with a first tire valve stem.

15. The air inflation system of claim 14, wherein the at least one air connection element further comprises a second air connection element that engages a first end of a second hose, the second hose including a second end that communicates with a second tire valve stem.

16. The air inflation system of claim 1, further comprising a spacer having an opening that receives the tubular member.

17. The air inflation system of claim 16, wherein the spacer aids in the connection of the tubular member and the sleeve member.

18. The air inflation system of claim 1, further comprising a hubcap, wherein the rotary coupler is threaded to the hubcap.

* * * * *